United States Patent
Doddavula

(10) Patent No.: US 9,037,880 B2
(45) Date of Patent: May 19, 2015

(54) METHOD AND SYSTEM FOR AUTOMATED APPLICATION LAYER POWER MANAGEMENT SOLUTION FOR SERVERSIDE APPLICATIONS

(75) Inventor: Shyam Kumar Doddavula, Bangalore (IN)

(73) Assignee: Infosys Limited, Bangalore (IN)

( * ) Notice: Subject to any disclaimer, the term of this patent is extended or adjusted under 35 U.S.C. 154(b) by 262 days.

(21) Appl. No.: 13/524,604

(22) Filed: Jun. 15, 2012

(65) Prior Publication Data

US 2013/0339759 A1     Dec. 19, 2013

(51) Int. Cl.
*G06F 9/50*     (2006.01)
*G06F 1/32*     (2006.01)

(52) U.S. Cl.
CPC ............ *G06F 1/3206* (2013.01); *G06F 9/5094* (2013.01)

(58) Field of Classification Search
CPC ... G06F 1/329; G06F 9/45558; G06F 1/3206; G06F 9/5094
USPC .......................................... 718/104; 713/300
See application file for complete search history.

(56) References Cited

U.S. PATENT DOCUMENTS

| | | | | |
|---|---|---|---|---|
| 7,127,625 B2 * | 10/2006 | Farkas et al. | .................. | 713/320 |
| 8,104,041 B2 * | 1/2012 | Belady et al. | ................. | 718/105 |
| 8,214,829 B2 * | 7/2012 | Neogi et al. | ..................... | 718/1 |

* cited by examiner

*Primary Examiner* — Albert Wang
(74) *Attorney, Agent, or Firm* — LeClairRyan, a Professional Corporation

(57) ABSTRACT

According to the one aspect of the present disclosure, a method for automated datacenter power management comprises, monitoring a metrics of an entity such as a virtual machine, an application level, a host level and an application platform. The method further comprises forecasting an application power usage by using monitored information from the entity. The monitored information can be but not restricted to a forecasted data, a historical data or a real-time data. Furthermore, the method also comprises the step of applying at least one control to the entity to manage the application power usage. The at least one control can be but not restricted to changing resource pool size at application platform level, changing resource allocations the virtual machine level and changing a processor clock speed at the host level to manage application power usage.

11 Claims, 2 Drawing Sheets

METHOD AND SYSTEM FOR AUTOMATED APPLICATION LAYER POWER MANAGEMENT SOLUTION FOR SERVERSIDE APPLICATIONS

FIELD OF THE INVENTION

The present disclosure relates to power management, and particularly, to a system and a method for automated application layer power management solution for server side applications.

BACKGROUND OF THE INVENTION

With increasing use of virtualization, traditional power management solutions which are designed for monolithic kernels are not applicable for virtualized environments. Power management usually involves a tradeoff with the performance levels offered. The challenge is to figure out how to reduce power consumptions with minimal performance degradation. The challenge is to stay within some given power budget while degrading performance as little as possible.

Modern datacenters manage power at a variety of scales. Traditional Datacenter power management solutions have been based on Platform/Host level and Virtualization level power management. Platform/Host level management solutions do not have the VirtualMachine (VM) level metrics so they can only achieve limited success. Some solutions have combined VM level power management solutions with Platform/Host level power management solutions. But these solutions similarly do not take into consideration application level metrics and so the accuracy of predictions and the accuracy of control is limited.

SUMMARY OF THE INVENTION

According to the one aspect of the present disclosure, a method for automated datacenter power management comprises, monitoring a metrics of an entity such as a virtual machine, an application level, a host level and an application platform. The method further comprises forecasting an application power usage by using monitored information from the entity. The monitored information can be but not restricted to a forecasted data, a historical data or a real-time data. Furthermore, the method also comprises the step of applying at least one control to the entity to manage the application power usage. The at least one control can be but not restricted to changing resource pool size at application platform level, changing resource allocations the virtual machine level and changing a processor clock speed at the host level to manage application power usage.

In another embodiment of the present disclosure, the method for automated datacenter power management comprises tracking at least one incoming request at the application level and identifying a transaction mix. A historical log is maintained which contains transaction information for each individual transaction. The future work load could be forecasted using standard statistical regression techniques. The processing unit utilization of a virtual machine and an individual process using a processor could be monitored and the application power consumption details could be forecasted.

BRIEF DESCRIPTION OF THE DRAWINGS

These and other features, aspects, and advantages of the present disclosure will be better understood when the following detailed description is read with reference to the accompanying drawings in which like characters represent like parts throughout the drawings, wherein.

DETAILED DESCRIPTION OF THE INVENTION

Figure 1:
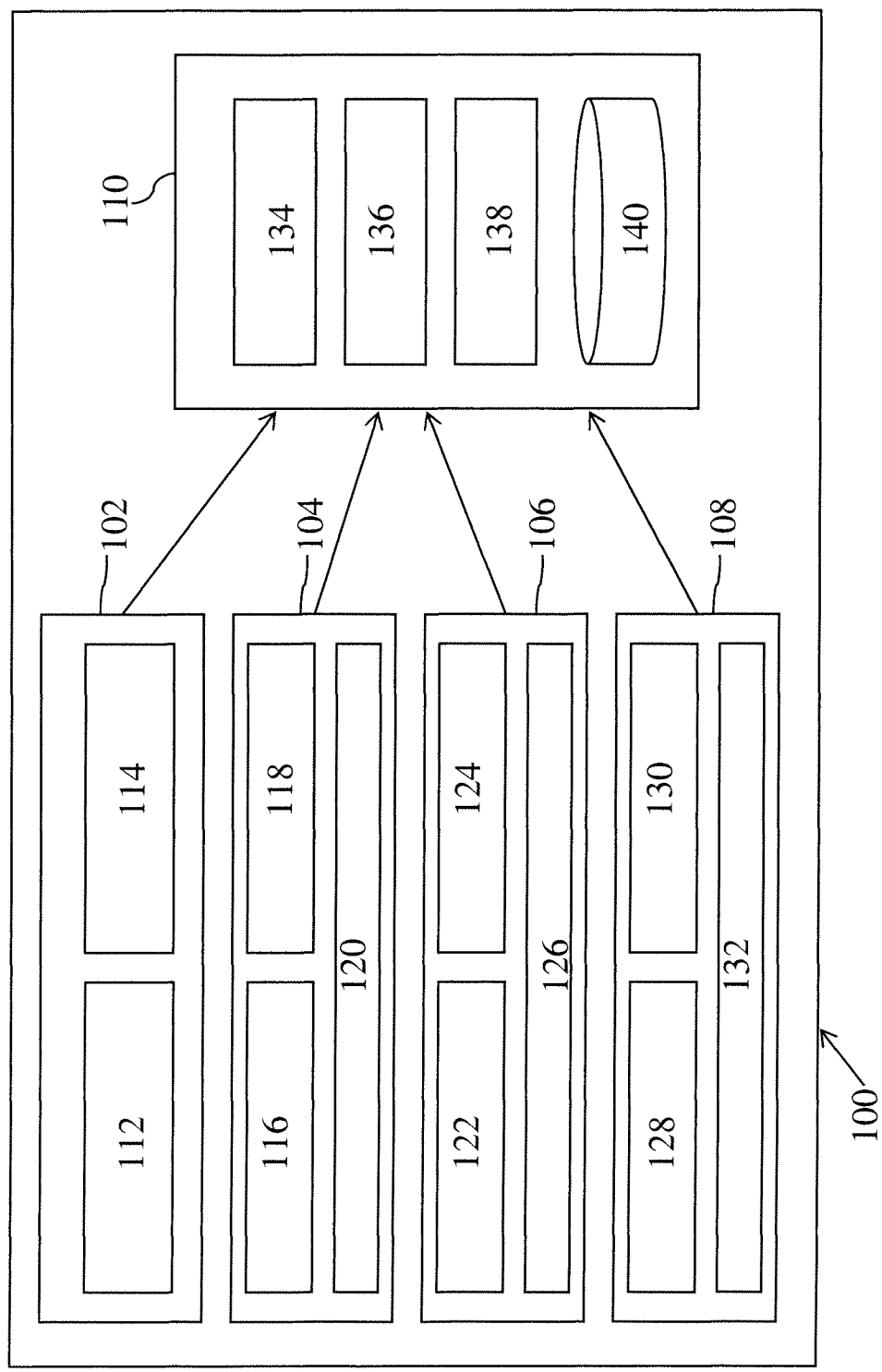
FIG. 1 illustrates an architecture for an automated datacenter power management system 100, in accordance with an embodiment of the present disclosure.

FIG. 1 illustrates an architecture for an automated datacenter power management system 100, in accordance with an embodiment of the present invention. Power management system 100 includes an Application Power Manager 102, an Application Server Paas Power Manager 104, a Virtual Machine (VM) Power Manager 106, a Host Power Manager 108 and a Datacenter Power Manager 110.

Application Power Manager 102 further includes an Application Power Optimizer 112 and an Application Manager 114. Application Server Paas Power Manager 104 further includes an Application Server Paas Monitor 116, an Application Server Paas Power Optimizer 118, and an Application Server Paas Manager 120. Virtual Machine Power Manager 106 further includes a VM Performance Monitor 122, a VM Power Optimizer 124, and a VM Performance Manager 126. Host Power Manager 108 further includes a Server Monitor 128, a Server Power Optimizer 130, and a Server Manager 132. The Datacenter Power Manager 110 further comprises a Power Optimization Coordinator 134, a Power Prediction engine 136, a Power Budgeting engine 138, and a Data-Store 140.

Application Power Manager 102 monitors and analyzes different transactions supported by an application and calculates individual processing and power needs of each transaction. Thus, Application Power Manager 102 performs a white-box analysis of the applications' transactions to realize power optimizations. Application Power Manager 102 then uses application level controls at Application Manager 114 for power optimization.

VM Performance Monitor 122 monitors the CPU utilization of the Virtual Machine (VM) for server and individual processes. VM Performance Manager 126 predicts future CPU utilizations based on forecasted workloads and also provides the resource utilization details at the host level.

Figure 2:
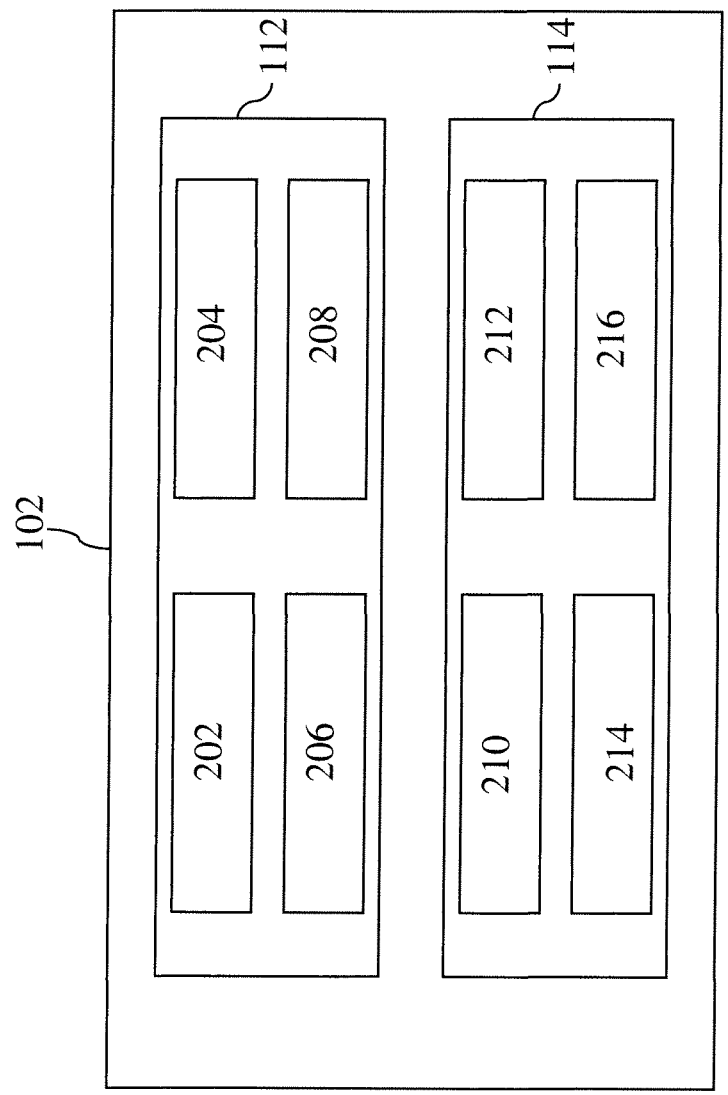
FIG. 2 illustrates a schematic block diagram of Application Power Manager 102, in accordance with an embodiment of the present disclosure.

FIG. 2 illustrates a schematic block diagram of Application Power Manager 102, in accordance with an embodiment of the present invention. Application Power Manager 102 includes Application Power Optimizer 112 and Application Manager 114. Application Power Optimizer 112 further includes an Application Service Level Prediction Engine 202, an Application Power Estimator 204, an Application Transaction Monitor 206, and an Application Transaction Forecaster 208. Application Manager 114 further includes an Application Configurator 210, an Application Cluster Manager 212, an Application Deployment Agent 214, and an Application Transaction Controller 216.

Application Power Manager 102 provides the components for performing actions at the application level, which can help manage application power consumption.

Application Configurator 210 and Application Deployment Agent 214 help automate the configuration and deployment of the applications. Application Configurator 210 helps pick different component implementations and set different thresholds for resource pooling, and so forth, so that application behavior and resource consumption can be managed.

Application Transaction Monitor 206 automatically discovers various transactions supported by an application. For example, in case of web applications, Application Transaction Monitor 206 tracks various URLs and accordingly, various transactions to be executed are identified. Application Transaction Monitor 206 can also be configured with user-defined inputs for transaction analysis. Application Transaction Monitor 206 then captures information about the various transactions it has identified, such as, number of requests, overall processing time, and so forth. Application Transaction Monitor 206 stores the captured information in Data-Store 140.

Data-Store 140 maintains a historical log of the captured transaction information for individual transactions of each application, server, cluster and data center for a configurable duration with configurable granularity. It also maintains a historical log of application, virtual machine and server performance metrics, such as throughput, CPU utilization, memory utilization, and the like.

Application Transaction Forecaster 208 uses techniques, such as, for example, 'ARIMA' for regression and 'Time Series analysis' to forecast workload values of individual transactions and workload values for transactions in combination with each other. This is then provided as input to Application Service Level Prediction engine 202 and Application Power Estimator 204.

Application Service Level Prediction engine 202 predicts other service level parameters such as response time, throughput, and so forth with different resource and configuration combinations using the forecasted workload values of the individual transactions and. In accordance with an embodiment, queuing theory may be used for performance analysis of the applications.

Application Power Estimator 204 uses any of the techniques, such as, forced flow law, utilization law, little's law, service demand law, and linear regression techniques to calculate service demand for the individual transactions of the various applications. It then uses the calculated service demand and the output from Application Transaction Forecaster 208 to forecast application power consumption.

Application Power Optimizer 112 uses information at application level, VM level and host level and optimizes the power consumption by using application level controls provided by the Application Manager 114, like migrating the application to a more power optimal application server, request throttling, delay introduction, etc.

Application Transaction Controller 216 provides mechanisms like transaction throttling, delay introduction, etc. to manage throughput of transactions, given an application deployment configuration. One of the proposed mechanisms is to create an Application server platform as a service cloud including an Application Migration Engine, which would help migrate applications across different application server instances so that power consumption of an application instance can be managed. The Application Migration Engine helps in migrating applications from one Application Server instance of Application Server PaaS platform to another.

The Application Server PaaS manager provides support for automation of application server clustering and application clustering so that it helps in varying the number of application instances that are part of cluster and load balancing algorithms to control the distribution of the application transactions across different instances, thereby providing mechanisms for optimizing power consumption while meeting application SLAs at application and application server level.

The present invention uses concepts for automating service level parameter predictions in scenarios comprising shared infrastructure and application servers, and uses the service level parameter predictions in automating power estimation. For example, let us assume that there are two applications, A1 and A2, with two transactions each, labeled A1T1, A1T2, and A2T1, A2T2 respectively. Let us assume transaction A1T1 uses resource-n as part of processing. The overall response time of the transaction is the sum of service time (Sn) the resource takes for processing and time Wn that transaction request spends waiting in the queue before being processed.

Service demand A1T1Dn for transaction A1T1 for resource Rn is the sum of all service times of the transaction for resource-n.

Applying forced flow law, utilization law, little's law and service demand law, the following equation can be deduced to get the service demand of the transaction request based on observed utilization values of a resource:

$$A1T1Dn = A1T1RUn / A1T1Xn$$

in an isolated environment with the resource-n processing only A1T1 requests and A1T1RUn is average utilization of resource-n and A1T1Xn is average number of A1T1 requests that are completed per unit of time. Since the applications are generally deployed in a shared environment with virtualization, it's is not possible to measure A1T1RUn. However, it is possible to identify all transactions and measure their individual throughputs and overall resource utilization RUn of system using the following equations:

$$RUn = A1T1RUn + A1T2RUn + A2T1RUn + A2T2RUn$$

Hence, $$RUn = (A1T1Dn*A1T1Xn) + (A1T2Dn*A1T2Xn) + (A2T1Dn*A1T1Xn) + (A1T2Dn*A2T2Xn)$$

Generalizing this, it can be represented in matrix notation as $$[RU] = [SD]*[X] \quad \text{Equation (1)}$$

where RU is utilization matrix, SD is the service demand matrix and X is throughput matrix. By using the measured values for RU and X, SD can be calculated. The SD matrix for all the application transactions is continuously calculated and updated. This makes the system adaptive to changes in application processing logic as newer versions are released.

The application transaction forecasting engine uses the historical time series information of the average requests received for each transaction at different time intervals T1, T2 ... Tt, such as like A1T1X1, A1T1X2 ... A1T1Xn to forecast the average requests in future time interval Tt+1 A1T1Xt+1.

This provides the transaction throughput matrix [X t+1] for a future time Tt+1.

The application transaction forecasting engine will therefore forecast the future throughput matrix for time [Xt+1]. Substituting this into Equation (1) gives the predicted resource utilization [RU t+1] for time Tt+1.

$$[RUt+1] = [SD]*[X t+1]$$

Several studies have shown that power utilization of a resource is a linear function of the utilization of the resource. Therefore, the power utilization PUn of Resource-n can be expressed as a function of its utilization RUn and the aggregate power consumption of a host with several resources can be expressed in matrix notation as $$PU = C1 + C2*(RU) \quad \text{Equation (2)}$$

By capturing the power utilizations at different resource utilizations levels and applying linear regression, the constants C1 and C2 can be calculated. This enables predicting the power consumption using the resource utilizations forecasted earlier.

Using the service demand values [SD], the application transaction throughput [X t+1] and the transaction flow across the different resources, Application Service Level Prediction Engine 202 creates a Queuing Model.

The service level of a transaction is a function of the service demand and service requests received per unit of time as shown in the equation below:

$$SLU=f([X],[SD])\qquad\text{Equation (3)}$$

The function is modeled by the Queuing model and is used to arrive at the service level with a combination of transactions and resources. Power optimizations are then applied by solving a cost equation that takes into consideration profits of meeting service levels, cost of violating service levels, cost of power consumed etc. and accordingly determines different actions.

Assuming for application transaction AxTx, AxTxPx represents the profit of meeting service level objective and AyTyLy represents the loss for application transaction AyTy from failing to meets its service level objective and assuming the total AzTzPU represents the power consumed by application transaction AzTz per transaction and C represents the cost of a unit of power. The objective of an Application Power Optimizer is to arrive at the application transaction throughput that supports the best optimized equation.

AxTxXt+1 represents the throughput of the application transaction AxTx, AyTyXt+1 represents the throughput of application transaction AzTz and AzTzXt+1 represents the throughput of application transaction AzTz given the constraint of the available resources.

$$\text{Total Profit}=\Sigma AxTxXt+1*AxTxPx-\Sigma AyTyXt+1*AyTyLy-\Sigma AzTzXt+1*AzTzPU*C$$

In view of the many possible embodiments to which the principles of our disclosure may be applied, we claim as our disclosure all such embodiments as may come within the scope and spirit of the following claims and equivalents thereto.

What is claimed:

1. A method for automated datacenter power management, the method comprising:
monitoring, by an automated datacenter power management apparatus, at least one metric of an entity;
forecasting, by the automated datacenter power management apparatus, an application power usage by using the monitored at least one metric from the entity; and
applying, by the automated datacenter power management apparatus, at least one control to the entity to manage the application power usage, wherein the applying the at least one control to the entity further comprises changing, by the automated datacenter power management apparatus, resource pool size at application platform level and resource allocations a virtual machine level.

2. The method of claim 1, wherein the entity is one or more of:
a virtual machine;
an application level;
a host level; or
an application platform.

3. The method of claim 1, wherein the monitored at least one metric is one or more of:
forecasted data;
historical data; or
real-time data.

4. The method of claim 1, wherein the applying the at least one control to the entity to manage the application power usage is further based on:
tracking, by the automated datacenter power management apparatus, at least one incoming request at an application level and identifying a transaction mix;
maintaining, by the automated datacenter power management apparatus, a historical log of transaction information for each individual transaction;
forecasting, by the automated datacenter power management apparatus, future work load using statistical regression techniques;
monitoring, the automated datacenter power management apparatus, a processing unit utilization of a virtual machine and an individual process; and
forecasting, by the automated datacenter power management apparatus, application power consumption details.

5. The method of claim 1, wherein the applying the at least one control to the entity to manage the application power usage is further based on:
calculating, by the automated datacenter power management apparatus, a service demand for a plurality of transactions of at least one application.

6. The method of claim 1, wherein the applying the at least one control to the entity to manage the application power usage is further based on:
predicting, by the automated datacenter power management apparatus, a future processing unit utilization based on the future work load.

7. The method of claim 1, wherein the applying the at least one control to the entity to manage the application power usage is further based on:
obtaining, by the automated datacenter power management apparatus, a resource utilization detail at a host level.

8. The method of claim 1, wherein the applying the at least one control to the entity to manage the application power usage further comprises:
enabling, by the automated datacenter power management apparatus, migration of the plurality of application and load balancing of application transactions for optimization.

9. The method of claim 1, wherein the applying the at least one control to the entity to manage the application power usage further comprises:
using, by the automated datacenter power management apparatus, information from the application level, a virtual machine level and the host level to optimize a power consumption.

10. The method of claim 1, wherein the applying the at least one control to the entity to manage the application power usage further comprises:
enabling, by the automated datacenter power management apparatus, migration of an application from one platform to another platform.

11. The method of claim 1, wherein applying at least one control to the entity to manage the application power usage further comprises:
changing, by the automated datacenter power management apparatus, a processor clock speed at the host level to manage application power usage.

* * * * *